United States Patent [19]

Stone

[11] Patent Number: 5,429,436

[45] Date of Patent: Jul. 4, 1995

[54] UNIBODY VERTICAL FORAGE MIXER WITH WEIGHING MECHANISM

[75] Inventor: Thomas E. Stone, Fairmont, Minn.

[73] Assignee: Art's-Way Manufacturing Co., Inc., Armstrong, Iowa

[21] Appl. No.: 270,369

[22] Filed: Jul. 5, 1994

[51] Int. Cl.⁶ .................. B01F 7/24; B01F 15/00
[52] U.S. Cl. .................. 366/141; 366/186; 366/196; 366/302; 366/314; 366/603; 241/186.4; 414/21; 414/505; 414/528
[58] Field of Search .................. 366/64, 65, 50, 141, 366/186, 192, 194–196, 302, 314, 318, 319, 323, 603; 241/101.7, 186.2, 186.4, 186.5; 414/21, 501–505, 523, 526–528, 532

[56] References Cited

U.S. PATENT DOCUMENTS

| | | |
|---|---|---|
| 212,232 | 2/1879 | Johnson . |
| 1,760,374 | 5/1930 | Pepper . |
| 2,676,002 | 4/1954 | Wolfe . |
| 2,786,655 | 3/1957 | Cowsert . |
| 2,800,238 | 7/1957 | Oliver .................. 366/603 X |
| 2,815,941 | 12/1957 | Schmale .................. 366/603 X |
| 2,825,511 | 3/1958 | Byberg . |
| 2,864,593 | 12/1958 | Shoup . |
| 2,894,733 | 7/1959 | Wosmek . |
| 2,896,923 | 7/1959 | Luscombe .................. 366/186 |
| 2,980,407 | 4/1961 | Luscombe . |
| 3,133,727 | 5/1964 | Luscombe .................. 366/186 |
| 3,263,969 | 8/1966 | Frank, Sr. .................. 366/314 |
| 3,667,734 | 6/1972 | Skromme et al. . |
| 3,780,993 | 12/1973 | Kline . |
| 3,997,146 | 12/1976 | Kline . |
| 4,003,502 | 1/1977 | Barcell .................. 366/603 X |
| 4,092,014 | 5/1978 | Hughes . |
| 4,134,690 | 1/1979 | Lindstrom . |
| 4,432,499 | 2/1984 | Henkensiefken et al. . |
| 4,474,478 | 10/1984 | DeLong . |
| 4,509,862 | 4/1985 | High et al. . |
| 4,607,802 | 8/1986 | Lamort . |
| 4,765,747 | 8/1988 | High, Jr. et al. .................. 366/186 |
| 4,984,900 | 1/1991 | Faccia .................. 366/305 |
| 5,020,918 | 6/1991 | Faccia .................. 366/279 |
| 5,072,825 | 12/1991 | Faccia . |
| 5,082,188 | 1/1992 | Urich .................. 241/101.7 X |
| 5,143,221 | 9/1992 | Faccia .................. 366/186 X |
| 5,143,449 | 9/1992 | Faccia .................. 366/349 |
| 5,154,510 | 10/1992 | Faccia .................. 366/193 |
| 5,175,917 | 1/1993 | Faccia . |
| 5,240,321 | 8/1993 | Miller .................. 366/45 |
| 5,294,064 | 3/1994 | Faccia .................. 241/101.7 |

FOREIGN PATENT DOCUMENTS

| | | |
|---|---|---|
| 0003813 | 9/1979 | European Pat. Off. . |
| 2076678 | 12/1981 | United Kingdom . |

OTHER PUBLICATIONS

Cutter Mixer Wagons, AGM Zootechnical Machinery, Faccia, no date shown.
Pagliari brochure Qualita' Che tura, undated.
Supreme Cutter Mixer Feeder brochure, undated.
Jay-Lor Advertisement by Ag Machinery, undated.
Mutti Adolfo Roller Car and Roller Feed brochure, dated Sep. 1992.
Roto-Mixer Vertical Feed Mixer, RM International, undated.
Supertino brochure, Vertical Single Feed Mixer-Chopper Carts, undated.
Tatoma Mezcladoras brochure, undated.
Techmagri Vertimix single page trade sheet, undated.

*Primary Examiner*—Timothy F. Simone
*Assistant Examiner*—Charles Cooley
*Attorney, Agent, or Firm*—Lockwood, Alex, Fritzgibbon & Cummings

[57] ABSTRACT

A vertical forage mixer is of a unibody-type construction to provide an especially strong and durable unit. The major components of the vertical forage mixer are secured-together, typically by welding, so that the various components are combined and tied together into a structure in which there is no need to isolate one component from any of the other components. A detachable weigh bar and hub combination assembly can be provided. A discharge conveyor can be included which features an adjustable conveyor run for varying discharge locations. A comb assembly can be associated with the discharge conveyor in order to facilitate even outflow of mixed forage or removal of foreign materials. A scroll assembly is also provided which is of a cantilevered variety and which is especially durable and facilitates aggressive mixing, including cutting when desired.

37 Claims, 6 Drawing Sheets

UNIBODY VERTICAL FORAGE MIXER WITH WEIGHING MECHANISM

DESCRIPTION

Background and Description of the Invention

The present invention generally relates to vertical forage mixers of the type that can be designed to be translatable through fields or over roadways, either as pull-behind implements or as self-powered vehicles. More particularly, the invention relates to vertical tub forage mixers that can exhibit a so-called unibody construction in which all important structural components are secured together in a substantially permanent manner which enhances the strength and durability of the vertical tub forage mixer.

So-called vertical tub mixers are available for cutting forage such as baled hay and for processing the mixed forage for delivery to feed locations and the like. Some such units include arrangements for blending nutritional supplements and the like with vegetable protein sources within the mixing tub. These types of vertical tub forage mixers can also include blade assemblies for cutting the forage or protein material strands to sizes that are more easily handled, mixed, conveyed and eventually consumed.

Vertical tub forage mixers are also known which include outfeed conveyors for directing the mixed forage materials from out of a door in the sidewall of the tub to a different location on and then off of the mixer implement or vehicle. At times, these outfeed arrangements are less than satisfactory, particularly with some crops such as those having a low density and a tendency to tumble. Other crops tend to clump, and the conveyed outflow from certain previously known tub mixers can be non-uniform and uneven.

It is also previously known to incorporate weighing systems into vertical tub mixers. The objective in these instances is to be able to monitor the quantity of forage material which is mixed and/or fed to livestock and the like. Often, weighing cells such as those which provide an output reading in response to pressure applied to the weighing cells, have been applied between the frame and the mixing tub. These types of structures can embody design efforts to isolate certain components of the mixing implement or vehicle from the scale device, the apparent objective being to eliminate any influence of varying non-forage weight sources on the weighing procedure. Isolation attempts of this type can be less than desirable; for example, attempting to maintain separate supporting arrangements for different components of the same implement or vehicle can detract from the strength and durability of the implement or vehicle.

Certain tub mixers directly mount both rotatable ends of the mixing auger or scroll assembly. Usually, this requires the use of structural components such as support bars or framing within the bin itself. Such structural components can present an obstacle to loading of the forage material into the tub and can interfere with the initial stages of mixing.

The present invention addresses these matters so as to provide a vertical tub mixer and (when desired) cutter that will process forage material which originate in the form of large bales including large round or cylindrical bales of hay or other forage material. In the preferred arrangement, the vertical tub mixer exhibits a unibody construction while still providing the capability for weighing the material that passes through the cutter. In addition to providing an over-all simpler arrangement and enhancing the strength and durability of the mixer implement or vessel, the unibody approach makes it possible to construct the mixer implement or vehicle of thinner gauge material. This lowers the cost of construction and reduces the total weight of the implement or vehicle, resulting in savings in operational costs and energy.

In summary, the preferred unibody construction of the vertical tub mixer ties all of the structural components together into a unit that will remain together even after extended use over rough terrain. Adequate weighing capabilities preferably are achieved by utilizing a weight sensor within one or more axle hubs to thereby weigh the implement or vehicle in its entirety, including any and all matter or objects positioned within or resting on the implement or vehicle. When provided, this weighing arrangement often is complemented by an additional weight sensor such as one positioned along the tongue hitch when the mixer takes the form of a pull-behind implement. The invention may also incorporate an off-feed conveyor system that facilitates proper placement and improved handling of a variety of different types of forage materials. In the illustrated preferred embodiment, the scroll assembly is mounted in a securely loaded cantilevered fashion to provide unobstructed access into the tub.

It is a general object of the present invention to provide an improved vertical forage mixer.

Another object of this invention is to provide an improved vertical tub forage mixer which exhibits superior strength and durability while still providing weight measurement capabilities that are commensurate with the needs of livestock handlers or forage mix preparers.

Another object of the present invention is to provide an improved vertical tub forage mixer and cutter that can be easily adjusted to modify the cutting capabilities of the device, including varying the cutting aggressiveness at different locations within the tub.

Another object of the present invention is to provide an improved forage mixer having a unibody construction which withstands stresses in both a longitudinal and a lateral direction.

Another object of this invention is to provide an improved vertical forage mixer which has an outfeed opening from the tub that is devoid of any substantial threshold which would interfere with smooth egress of mixed material from the tub and onto a conveyor for Seeding off of the vertical forage mixer.

Another object of the present invention is to provide an improved vertical tub forage mixer having a durable and secure cantilevered scroll assembly.

Another object of this invention is to provide an improved forage mixer and cutter which utilizes easily installed load cell axle subassemblies that facilitate transport of the mixer and cutter prior to delivery to the end user.

These and other objects, features and advantages of the present invention will be clearly understood through a consideration of the following detailed description.

BRIEF DESCRIPTION OF THE DRAWINGS

The invention will be further elucidated in the following description with reference to the drawings in which.

DESCRIPTION OF THE PARTICULAR EMBODIMENTS

The various drawings hereof depict various features of a vertical tub forage mixer in form of a pull-behind implement. It is to be appreciated that the principles of the present invention are also applicable to embodiments wherein the apparatus is stationary or wherein it also includes self-powering means in order to provide a tub vertical forage mixer vehicle.

Figure 1:
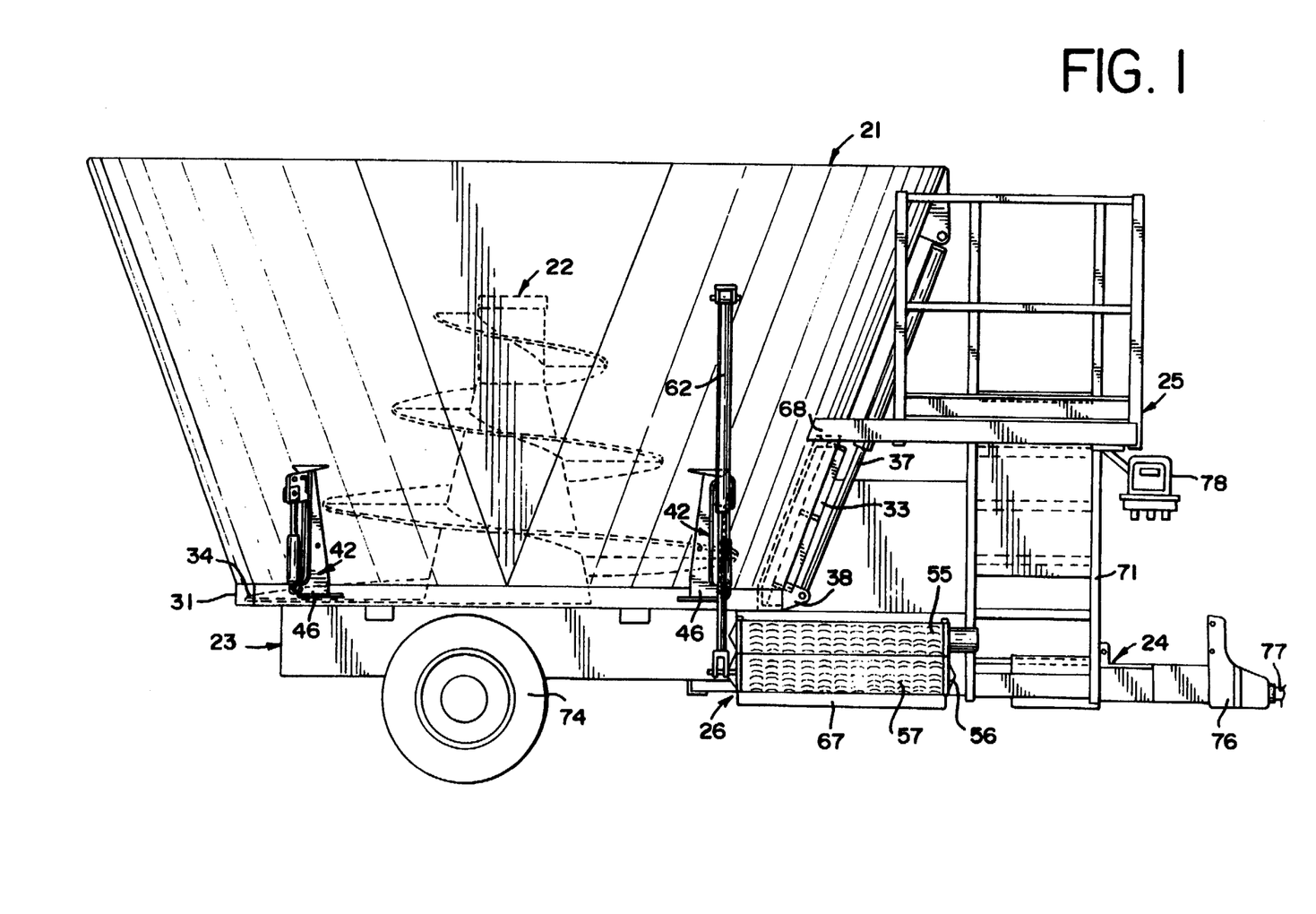
FIG. 1 is an elevational side view of a preferred apparatus in accordance with the present invention.

The implement illustrated in FIG. 1 includes a mixing tub having generally frusto-conical wall components, generally designated as 21, a mixing auger assembly mounted therewithin in cantilevered fashion and generally designated as 22, a chassis assembly, generally designated as 23, a tongue assembly associated therewith, generally designated as 24, an observation platform assembly which is generally designated as 25, and a discharge conveyor assembly, generally designated as 26.

Figure 2:
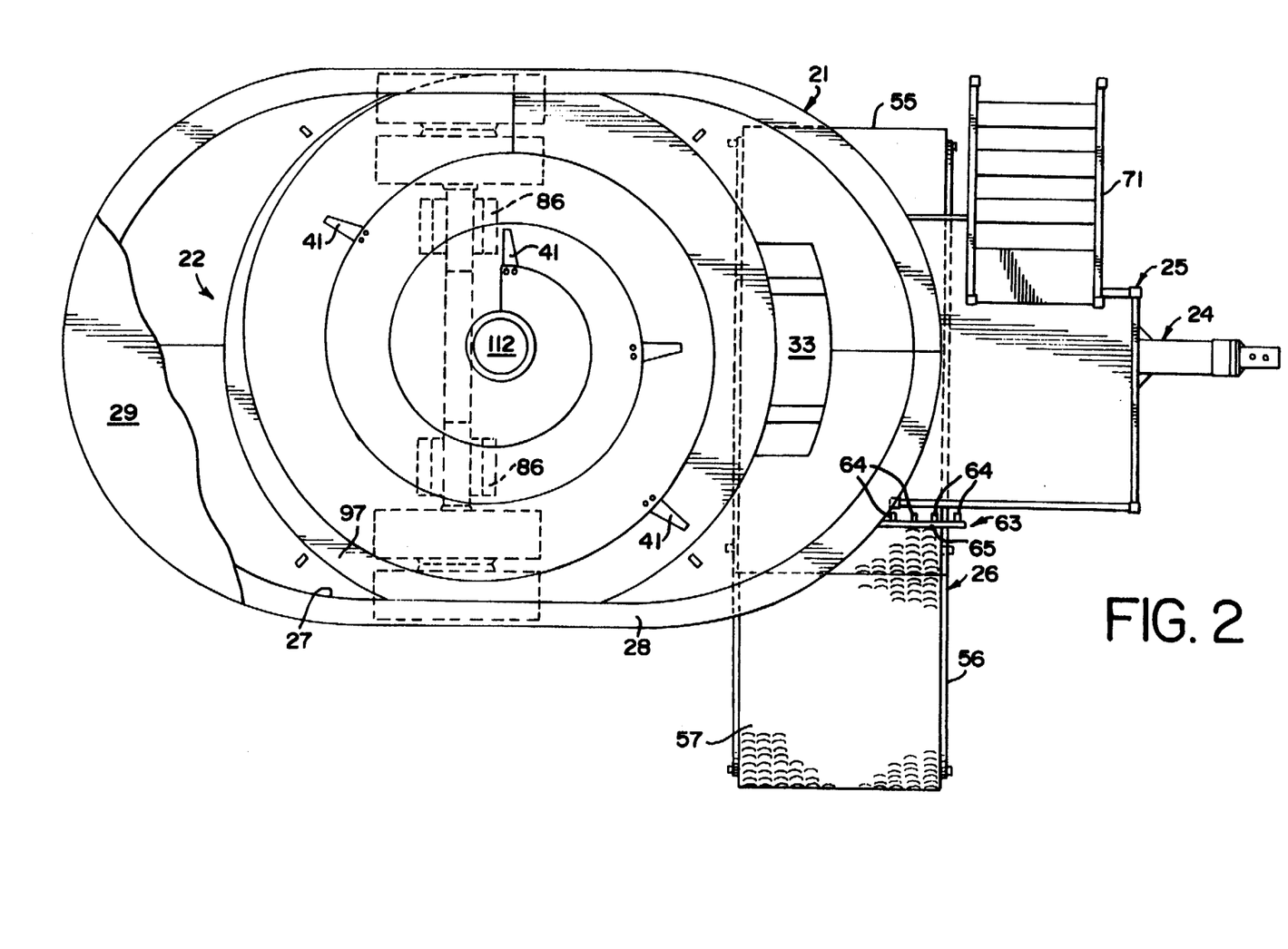
FIG. 2 is a top plan view, partially broken away, of the apparatus generally illustrated in FIG. 1.
Figure 3:
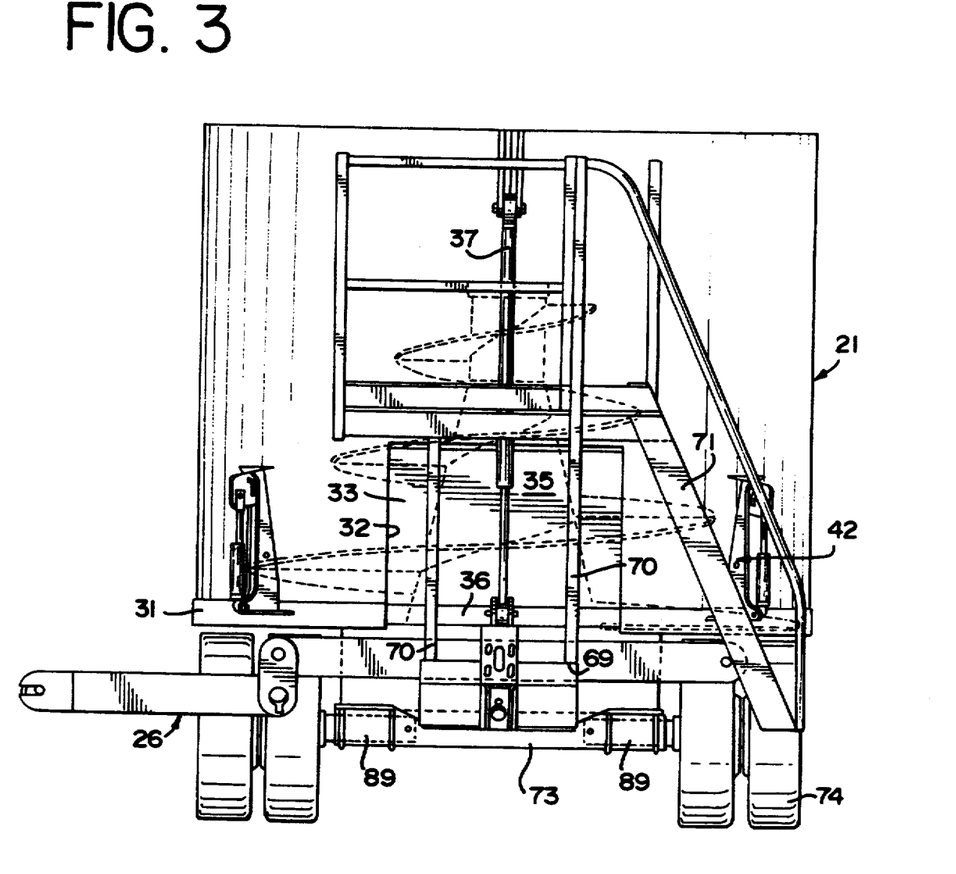
FIG. 3 is front-elevational view of the apparatus generally illustrated in FIG. 1.
Figure 4:
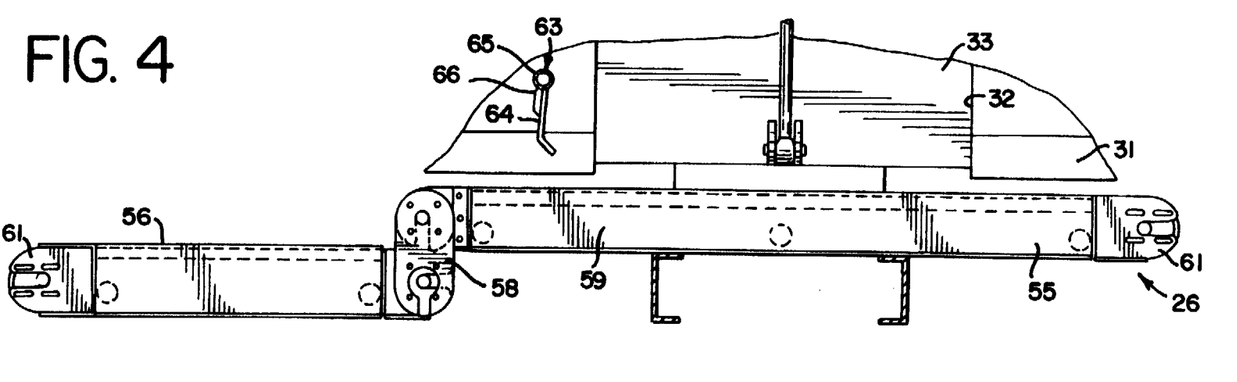
FIG. 4 is a detail view of certain components illustrated in FIG. 3, partially broken away.
Figure 10:
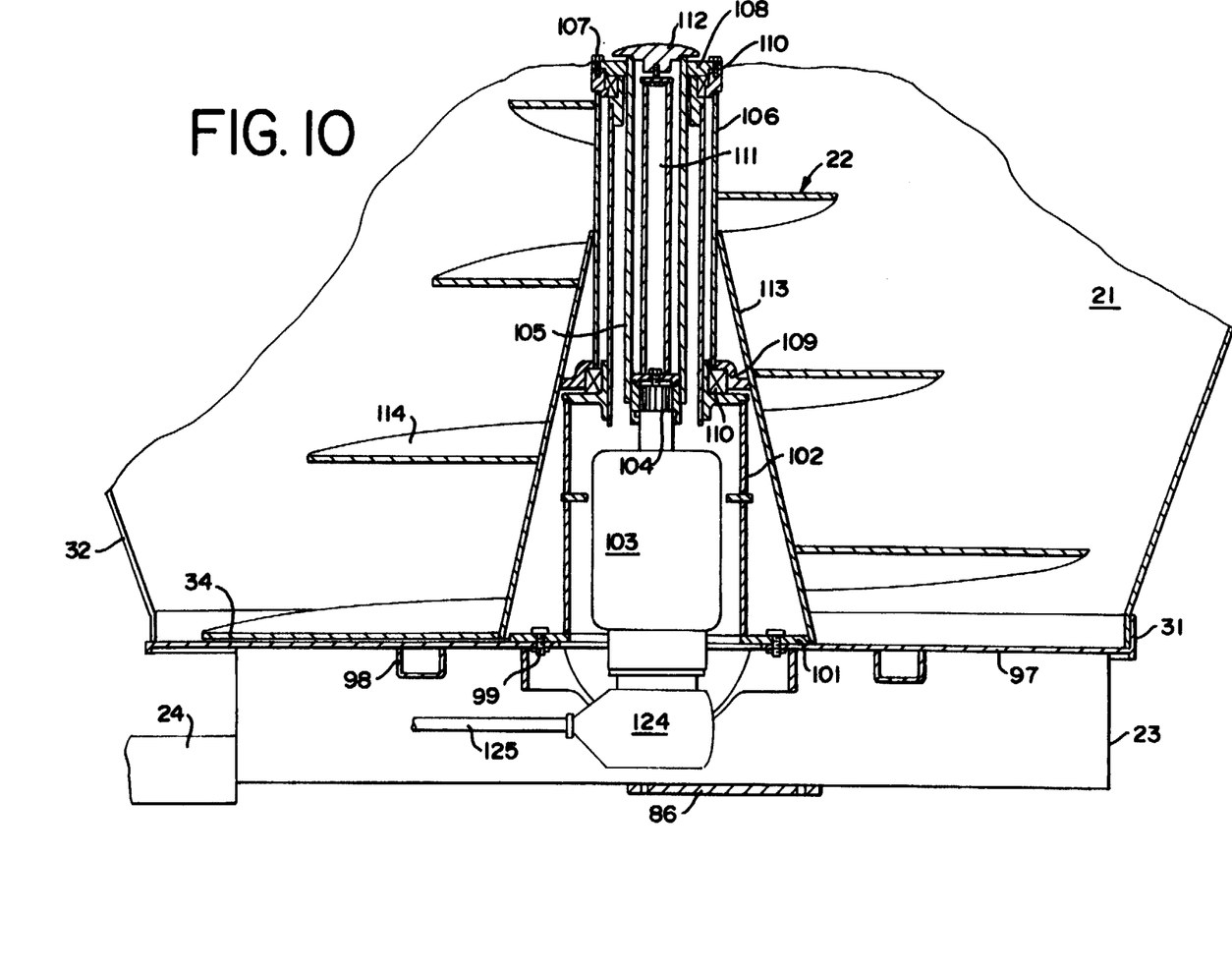
FIG. 10 is a view, primarily in cross-section, illustrating details of the preferred scroll assembly rotatably mounted in cantilevered fashion within the mixing tub.

Mixing tub 21 has a longitudinally stretched generally frusto-conical configuration and includes a widemouthed access opening 27 (FIG. 2). Mouth 27 may be defined by a peripheral flange 28 to which a rigid cover 29 can be secured at times when forage material is not being fed into the tub. A peripheral, generally vertical bottom side plate 31 is shown. As can be seen in FIGS. 3, 4 and 10, this bottom side plate 31 is gapped at a location that coincides with an opening 32 in the tub wall for accommodating an exit door 33. With this arrangement, the mixing auger assembly 22, and especially its bottommost blade 34 (FIG. 10) will sweep along the bottom of the mixing tub 21 and, in effect, scrape residual forage material off of the bottom of the tub and out of the opening 32 (when exit door 33 is opened), which is readily accomplished because of this gapped side plate 31 and the lack of any substantial bottom threshold structure at the opening 32.

Illustrated exit door 33 is slidably mounted along the side wall of the mixing tub. Door 33 generally corresponds in shape to that of the tub sidewall at the location of the opening 32. Included in this regard is the provision of a curved door panel 35 joined to a curved bottom plate 36 (FIG. 3). Curved door panel 35 generally follows the curve of the mixing tub at this location, and curved lower door plate 36 follows the curve of the tub floor at the gap in the bottom side plate 31. The illustrated exit door 33 is operated by a suitable cylinder assembly 37 secured to a door gusset 38. It will be appreciated that, with the door 33 opened and the mixing auger assembly 22 in operation, forage material within the tub 21 will flow out of the opening 32 and onto the conveyor assembly 26.

Figure 9:
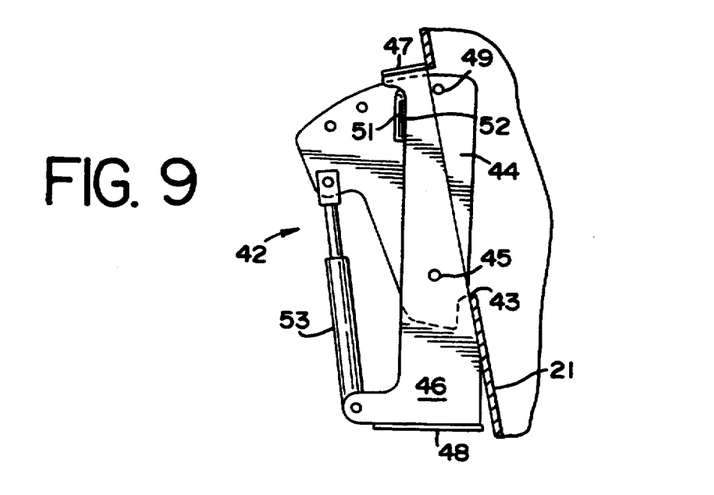
FIG. 9 is a view, primarily in elevation, of an adjustable forage holding unit shown incorporated into the wall of the mixer tub.

It will be further appreciated that the mixing auger assembly 22 will churn the materials within the mixing tub 21 in order to accomplish a desired mixing function. Any desired cutting of proteinaceous forage material and the like will be facilitated by blades 41 (FIG. 2) positioned at various locations along the flights of the auger assembly. Additional cutting action can be achieved by providing one or more adjustable forage holding assemblies within elongated openings 43 in the sidewall of the mixing tub 21. One such adjustable forage holding assembly 42 is illustrated in FIG. 9. A holding blade 44 is pivotally mounted at pivot 45 between opposing mounting plates 46 joined together by a top plate 47 and a bottom plate 48. In this embodiment, adjustment is achieved by providing a plurality of openings 49 through the cutter blade 44. An L-pin 51 is insertable into and removable from any one of the openings 49. Pin 51 restricts movement of the cutting blade 44 when it engages a stop surface 52 on at least one of the mounting plates 46. When cylinder 53 is extended, the cutter blade 44 will enter the mixing tub to the extent permitted by the L-pin 51. In the preferred embodiment, each adjustable blade assembly 42 is moved to its preselected extension location by the simultaneous activation of each cylinder 53. The actual extent of movement of the holding blade 44 in a particular adjustable forage holding assembly 42 can vary from assembly to assembly, depending upon the positioning of the L-pin in each assembly. In effect, the location of the L-pin provides the means for stopping the hydraulic cylinder 53 during its opening mode.

Discharge conveyor assembly 26 as illustrated is of the endless belt variety and includes both a stationary conveyor assembly 55 and a movable conveyor assembly 56. Preferably, both of the endless belts of assemblies 55 and 56 have an outside or working surface that includes a crescent mold pattern 57 therethroughout. This crescent mold pattern is within a rubber, synthetic rubber, or polymer having a similar coefficient of friction molded belt. Each crescent element is raised well above the surface of the belt and provides an especially aggressive action on forage material deposited thereonto. This aggressiveness is adequate to positively move forage material of even the lightest density and in a manner that is superior to that of a typical forage conveyor made of metallic mesh with transverse bars positioned therealong. In addition to the aggressive configuration provided by the raised crescent pattern, the rubber or polymeric material exhibits a greater coefficient of friction than previously utilized forage conveyors.

With more particular reference to the movable discharge conveyor assembly 56, in the illustrated embodiment, a link member 58 is secured to a side rail 59 of the outfeed conveyor assembly 55, which also includes a mounting adjusting plate 61. The movable discharge conveyor assembly 56 is pivotally mounted to the link member 58. A control member 62 such as the illustrated piston and cylinder is provided to move the movable discharge conveyor assembly 56 between a vertical, transport position and a discharge position. The discharge position can be generally horizontal as illustrated in the drawings, or it can be positioned at whatever location is desired for delivering the mixed forage material to the desired location. This orientation can be such that the discharge end of the conveyor assembly 56 is either above or below the pivoted end thereof.

Also associated with the discharge conveyor assembly 26 in the illustrated embodiment is a comb assembly 63. Included in this regard are a plurality of tines or fingers 64 (FIG. 4) which extend transversely along the length of a support bar 65. The comb assembly 63 will insure that forage material which tends to clump and feed somewhat sporadically will be generally evened out by a combing action. A torsion spring or other biasing arrangement 66 will permit rotation (in a clockwise direction as viewed in FIG. 4) in the event of excessive forage material or a foreign object coming into engagement with the comb assembly 63. The biasing arrangement 66 will reposition the comb into its operative position when this obstacle has passed.

If desired, the tines 64 or another component of the comb assembly can exhibit magnetic attributes for purposes of collecting and/or detecting fero-magnetic materials within the forage mixture. Detectors for other metals or foreign objects could also be provided at the comb assembly as desired. In addition, similar magnetic or detector components can be positioned on or generally at the location of an end plate 67 (FIG. 1) of the movable conveyor assembly or at some other location along the bottom of the path of the discharge conveyor assembly.

Figures 6, 7, 8:
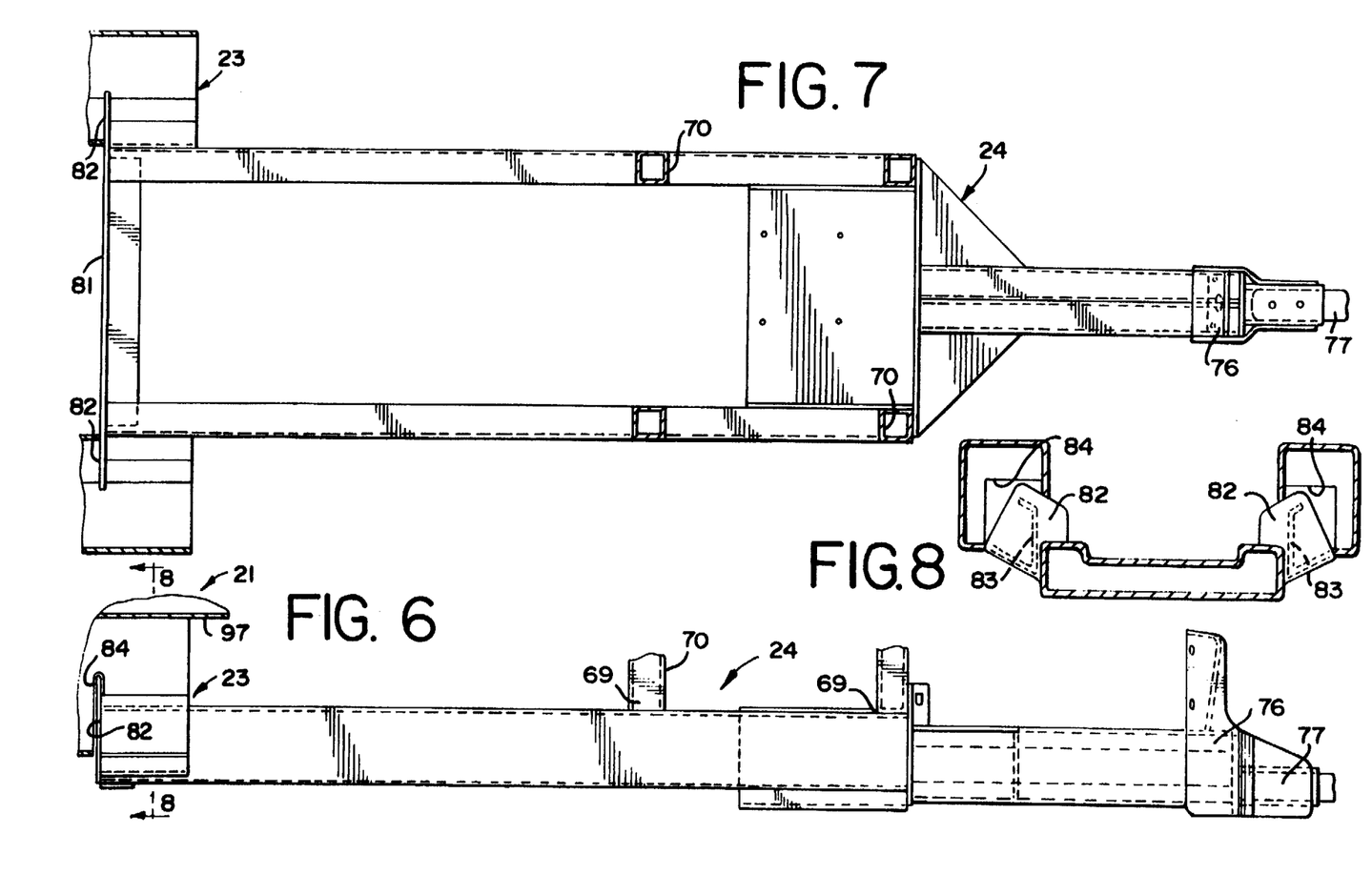
FIG. 6 is an elevational view showing the hitch tongue weldment assembled to the chassis weldment of the implement generally shown in FIG. 1.
FIG. 7 is a view, primarily in top plan, of the hitch tongue weldment assembly illustrated in FIG. 6.
FIG. 8 is a cross-sectional view generally along the line 8—8 of FIG. 6.

Observation platform assembly 25 is secured, preferably by welding, directly to the mixing tub 21 such at locations 68 (FIG. 1). Further support is provided by securement, such as by welding, to the tongue assembly 24, such as a location 69 (FIG. 6). This securement can be by way of platform support legs 70 as shown. An auxiliary ladder 71 can also be secured to a suitable location along the chassis and/or tub. It will be appreciated that, by this arrangement, the observation platform assembly 25 is secured as a unitary construction to the rest of the mixer apparatus and functions to further tie together the tub 21 and the tongue assembly 24. No isolation of the observation platform assembly 25 is desired or required in accordance with the present invention.

Figure 5:
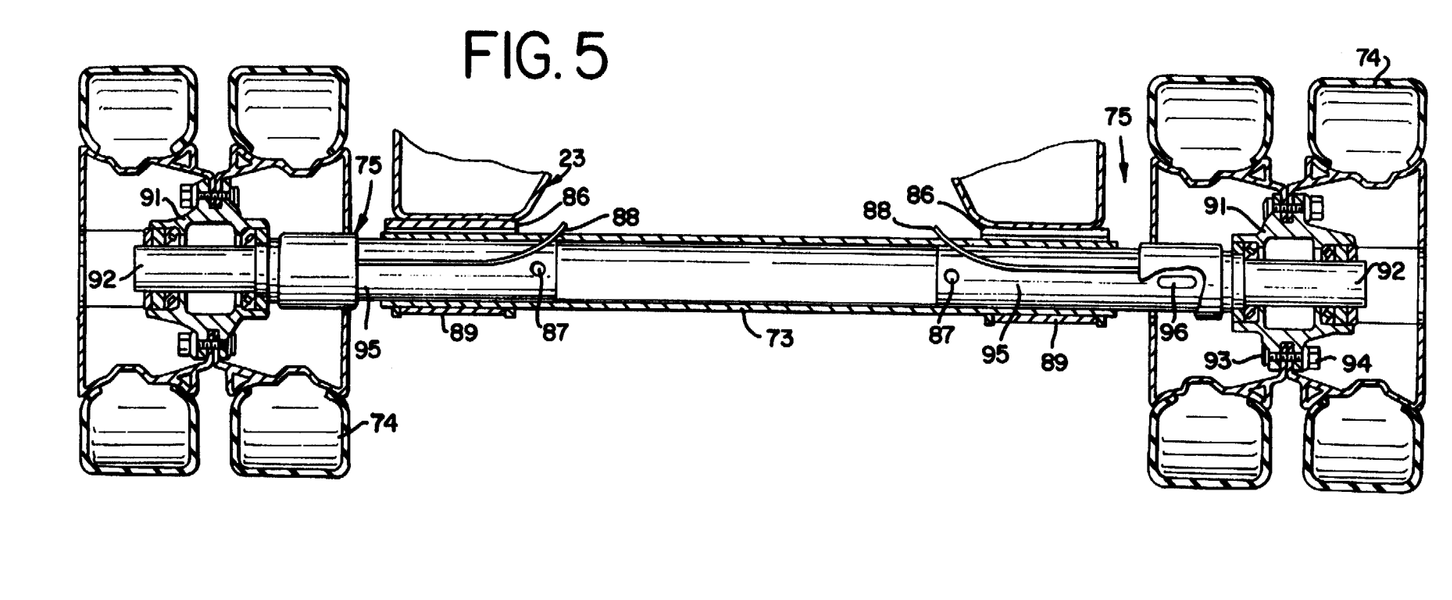
FIG. 5 is an enlarged cross-sectional longitudinal view along the axle assembly which is generally shown in FIG. 3.

Chassis assembly 23 and tongue assembly 24 are secured to each other in a strong and durable manner in accordance with the unibody construction described herein in order to better withstand both lateral and longitudinal forces that are applied to the chassis and tongue unibody assembly during operation of the apparatus. From an overall point of view, in the illustrated embodiment, the chassis assembly 23 is securely mounted to an axle tube 73 (FIGS. 3 and 5) into which are rotatably mounted a plurality of ground-engaging wheel and tire assemblies 74. In a preferred arrangement, one or more weigh bar assemblies, generally designated at 75, are positioned along the axle tube 73 as described in greater detail herein. Tongue assembly 24 includes a hitch end 76, and a load cell 77 preferably is properly positioned so as to achieve a weighing function at the general location at which the hitch 76 is secured to a tractor or the like (not shown). In this manner, the weigh bar assembly(s) 75 and the load cell 77 cooperate to accurately weigh the entirety of the apparatus, including the observation platform assembly 25 and anything or anyone positioned thereon, as well as any forage material within the mixing tub and remaining on the conveyor assembly.

A programmable digital indicator 78 allows the operator to carefully monitor weights as desired, including accounting for extraneous loads on the apparatus, such as a person standing on the observation platform during weighing or outfeeding activities. In the illustrated embodiment, this indicator 78 is swingably mounted so as to be visible from the tractor cab or from either side of the mixing apparatus, depending upon the position to which it has been swung.

Referring more specifically to the unibody construction and especially to the assembly of the tongue and chassis, reference is made to FIGS. 6, 7 and 8. The rear end of tongue assembly 24 includes a plate 81 having end flanges 82. In the illustrated embodiment, end flanges 82 are offset from the body portion of the plate 81 by an acute angle as illustrated. Strengthening ribs 83 can also be included as illustrated. A pair of transverse slots 84 are provided within the front end portion of the chassis assembly 23, such being sized and positioned to accommodate the flanges 82. Preferably, the flanges and slots are suitable joined by welding. The resulting assembly is a secure unibody full chassis assembly by which any movement between its chassis assembly component and its tongue assembly component is controlled by the combined lateral and longitudinal engagement between the end flanges 82 and the slots 84.

A plurality of axle mount plates 86 are bolted and/or otherwise secured to the bottom of the chassis assembly 23. Each plate 86 is correspondingly secured, such as by a plurality of bolts, to the axle tube 73. When weigh bar assemblies 75 are not included, the plate(s) can perform a weighing function, such as being load cell plates. When included, the weigh bar assemblies 75 are mounted within the axle tube 73, such as by means of a through bolt 87 which secures each weigh bar in place within the axle tube 73. The weigh bar assemblies 75 are of a generally known construction, and data transmission lines 88 are generally illustrated. An axle tube wrapper 89 facilitates attachment between the tube within which the weigh bar assembly 75 is mounted and the axle mount plate 86.

A hub assembly 91 is slid over weigh bar member 92 in conjunction with suitable bearing assemblies as shown. Wheel mounting includes the use of studs 93 and lugs 94. The spindle axle 95 is the portion of the weigh bar assembly which is inserted into the axle tube 73. By this overall arrangement, the load on the hub assemblies 91 is detected by the weigh bar assemblies 75 or the load cells. When weigh bar assemblies 75 are utilized, their function is greatly facilitated by including a slot 96 in the spindle 95 in order to allow the spindle to deflect so a strain gauge reading can be taken. Otherwise, the axle assembly is too stiff to permit the deflection needed to activate the strain gauge and transmit the proper signal to the monitor or indicator 78.

As previously mentioned, rotation of the mixing auger 22 blends a wide variety of rations, including mixing large quantities of hay with other components as desired. Cutting action can also be achieved as generally discussed herein. This is accomplished without requiring a top-end support for the auger assembly 22, which would impede access into the mixing tub. Instead, a cantilevered mounting arrangement is provided. The preferred mounting arrangement is illustrated in detail in FIG. 10. Mixing tub bottom plate 97 is secured to the chassis assembly 23, preferably with the assistance of transverse beams 98. It is preferred that the mixing tub 21 be thus secured to the chassis assembly by welding in order to enhance the unibody construction aspect of the apparatus. The mixing auger assembly 22 is secured to the mixing tub bottom plate 97 by a plurality of bolts or the like 99 secured to a base pedestal plate 101 of a pedestal tube 102.

A suitable drive assembly, preferably including a planetary gearbox 103, drive gearbox 124 and drive shaft 125, connect with a power source such as a power take-off (PTO) of a tractor or other suitable vehicle. Preferably, the drive assembly includes a multiple-speed gearbox to provide, for example, a lower gear ratio for cutting and a higher gear ratio for mixing. A splined hub 104 or other suitable means efficiently transmits the rotational power of this drive assembly to a power torque tube 105. A rotatable pedestal tube 106 is secured to the power torque tube 105, and the desired preload for this assembly is achieved at bolts 107 in association with the top pedestal plate 108. The weight of the scroll assembly is generally supported at this location and at the location of a lower pedestal plate 109. Appropriate bearings 110 are positioned to facilitate rotation between the rotatable pedestal tube 106 and the stationary pedestal tube 102. A hold-down scroll assembly or a retainer 111 with its pedestal cover 112 helps provide the needed cantilevered support during rotation of the mixing auger assembly 22 by providing assembly tension.

A scroll pedestal 113 is rotatably secured to the pedestal tube 102 through an appropriate bearing arrangement. This typically takes the form of a pedestal cone to which the auger assembly is attached. Auger assembly includes a plurality of auger flights 114, with blades being secured thereto as desired and as generally discussed elsewhere herein.

In the preferred embodiment, the following components are assembled in a solid unibody construction: mixing tub assembly 21, chassis assembly 23, tongue assembly 24, observation platform assembly 25 and axle tube 73. Discharge conveyor assembly 26 can be included, and it can be bolted or welded as desired. It will be appreciated that the axle tube assists in tying together the bottom of the unibody structure. Because the axle tube 73 comprises a part of the unibody construction, the axle components themselves may be in a disassembled state for transport and storage inasmuch as they can be easily slid into place at or near the point of sale. This facilitates shipping in reducing the overall size and enhancing the packageability and securement of the unit for transport when the axle and wheel components, including the weigh bar assemblies, are detached.

It will be understood that the embodiments of the present invention which have been described are illustrative of some of the applications of the principles of the present invention. Various modifications may be made by those skilled in the art without departing from the true spirit and scope of the invention.

I claim:

1. A transportable vertical mixer for forage materials, the vertical mixer having a unibody construction and comprising:
    a generally frusto-conical mixing tub assembly having a mixing tub member with a wide-mouthed access opening for receiving forage material within the mixing tub assembly;
    a generally vertical mixing auger assembly rotatably mounted within said mixing tub assembly;
    a chassis assembly which supports said mixing tub assembly and to which said mixing tub assembly is secured, said chassis assembly having a plurality of wheels rotatably mounted therefrom by virtue of which the vertical mixer is transportable from one location to another;
    an observation platform assembly secured both to said chassis assembly and to said mixing tub assembly; and
    a weighing mechanism which is in weight-receiving engagement with said chassis assembly, said weighing mechanism measures the weight of the entire vertical mixer including said mixing tub assembly, said mixing auger assembly, said chassis assembly and said observation platform assembly, together with any forage material and anything else which is in or on the vertical mixer.

2. The vertical mixer in accordance with claim 1, wherein said tub assembly, said chassis assembly and said observation platform assembly comprise a solid weldment defining at least a portion of said unibody construction of the vertical mixer.

3. The vertical mixer in accordance with claim 1, wherein said chassis assembly includes a main chassis component and a tongue component, said main chassis component and tongue component forming a solid weldment, and said observation platform assembly is welded to both said mixing tub assembly and said tongue component.

4. The vertical mixer in accordance with claim 2, wherein said chassis assembly includes a main chassis component and a tongue component, said main chassis component and tongue component forming a solid weldment, and said observation platform assembly is welded to both said mixing tub assembly and said tongue component.

5. The vertical mixer in accordance with claim 1, wherein said observation platform assembly is welded to both of said mixing tub assembly and to said chassis assembly.

6. The vertical mixer in accordance with claim 2, wherein said observation platform assembly is welded to both of said mixing tub assembly and to said chassis assembly.

7. The vertical mixer in accordance with claim 1, wherein said chassis assembly includes a tongue component having a projecting flange at a rear portion thereof and a chassis component having a slot at a front portion thereof, and said tongue component flange is inserted into and secured to said chassis component slot.

8. The vertical mixer in accordance with claim 1, wherein said mixing tub assembly includes a door for selectively opening and closing an opening through a sidewall of the mixing tub member, said mixing tub assembly includes a mixing tub bottom floor along the periphery of which is located a generally vertical side plate which extends around the periphery of the floor except at the location of said opening through the tub member sidewall in order to define a side plate gap, the side plate gap thus defining a substantially unobstructed pathway out of the mixing tub member when said side plate gap is unobstructed by said door.

9. The vertical mixer in accordance with claim 1, wherein said mixing tub assembly includes a sidewall and at least one adjustable forage holding assembly positioned at elongated openings through the sidewall of the mixing tub member, said adjustable forage holding assembly including a pivotally mounted holding blade having a plurality of adjustment locations and a stop member selectively positionable at each adjustment location, said adjustable forage holding assembly further including a movement assembly to impart pivoting movement to the holding blade, the extent of said pivoting movement being controlled by said stop member.

10. The vertical mixer in accordance with claim 1, further including a discharge conveyor assembly secured thereto, said discharge conveyor assembly providing a conveyed pathway extending between an outlet opening of the mixing tub member and a forage material discharge location, said discharge conveyor assembly including a stationary conveyor assembly and a movable conveyor assembly, said stationary conveyor assembly extending from a location at said opening the mixing tub member and to an end location, and said movable conveyor assembly extending from said end location of the stationary conveyor assembly to a free end thereof, said free end being adjustable between a top position generally above said end location of the stationary conveyor assembly and a bottom position which is below said end location of the stationary conveyor assembly.

11. The vertical mixer in accordance with claim 10, wherein said discharge conveyor assembly includes endless conveyor belting having an outside working surface with a raised pattern of a plurality of generally crescent-shaped members.

12. The vertical mixer in accordance with claim 11, wherein said endless belting is constructed of a material selected from the group consisting of rubber, synthetic rubber, and polymeric materials having a coefficient of friction on the order of or greater than synthetic rubber.

13. The vertical mixer in accordance with claim 1, further including a discharge conveyor assembly having a conveyed pathway and being mounted onto the vertical mixer and a comb assembly spaced above said discharge conveyor assembly.

14. The vertical mixer in accordance with claim 13, wherein said comb assembly includes a support bar positioned transversely with respect to the flow path of the discharge conveyor assembly, said support bar including a plurality of tines projecting generally downwardly therefrom.

15. The vertical mixer in accordance with claim 14, further including a biasing member for permitting movement of said tines in a direction generally coinciding with the conveyed pathway of the discharge conveyor assembly when a preselected force is exceeded.

16. The vertical mixer in accordance with claim 14, wherein at least some of said tines have magnetic properties.

17. The vertical mixer in accordance with claim 1, further including an axle securely mounted to said chassis assembly to which is secured at least one weigh bar assembly.

18. The vertical mixer in accordance with claim 1, further including an axle securely mounted to said chassis assembly to which is secured at least one weigh bar assembly to which at least one of said plurality of wheels is mounted for rotation.

19. The vertical mixer in accordance with claim 18, wherein said at least one weigh bar assembly includes a spindle mounted within said axle, said spindle including a slot to facilitate deflection of the at least one weigh bar assembly when mounted within the axle.

20. The vertical mixer in accordance with claim 18, further including a load cell positioned at a hitch end of the chassis assembly.

21. The vertical mixer in accordance with claim 18, wherein said at least one weigh bar assembly is located within the axle and is secured therein in a removable manner, the at least one weigh bar assembly and wheel being removable for shipping.

22. The vertical mixer in accordance with claim 1, wherein said mixing auger assembly includes a rotatable auger assembly rotatably secured to vertical tubing securely-fixed to the bottom of the mixing tub assembly and only to the bottom of the mixing tub assembly, said rotatable auger assembly being in driven relationship with a driving assembly which is in driven relationship with a source of rotational power.

23. The vertical mixer in accordance with claim 22, wherein the mixing auger assembly further includes a hold down assembly securing a rotatable drive tube to said driving assembly and to said rotatable auger assembly.

24. A transportable vertical mixer for forage materials, the vertical mixer having a unibody construction and comprising:
a mixing tub assembly having a mixing tub member with a wide-mouthed access opening for receiving forage material within the mixing tub assembly;
a generally vertical mixing auger assembly rotatably mounted within said mixing tub assembly;
a chassis assembly which supports said mixing tub assembly and to which said mixing tub assembly is secured, said chassis assembly having a plurality of wheels rotatably mounted therefrom by virtue of which the vertical mixer is transportable from one location to another;
a weighing mechanism which is in weight-receiving engagement with said chassis assembly, said weighing mechanism measures the weight of the entire vertical mixer including said mixing tub assembly, said mixing auger assembly, and said chassis assembly, together with any forage material and anything else which is in or on the vertical mixer; and
said mixing tub assembly includes a door for selectively opening and closing an opening through a sidewall of the mixing tub member, said mixing tub assembly includes a bottom floor along the periphery of which is located a generally vertical side plate which extends around the periphery of the floor except at the location of said opening through the tub member sidewall in order to define a side plate gap, the side plate gap thus defining a substantially unobstructed pathway out of the mixing tub member when said side plate gap is unobstructed by said door.

25. A vertical mixer for forage materials, the vertical mixer having a unibody construction and comprising:
a mixing tub assembly having a mixing tub member with a wide-mouthed access opening for receiving forage material within the mixing tub assembly;
a generally vertical mixing auger assembly rotatably mounted within said mixing tub assembly;
a chassis assembly which supports said mixing tub assembly and to which said mixing tub assembly is secured;
a mixer supporting assembly which supports the vertical mixer with respect to the ground;
a weighing mechanism which is in weight-receiving contact with said mixer supporting assembly and which measures the weight of the entire vertical mixer including said mixing tub assembly, said mixing auger assembly, and said chassis assembly, together with any forage material and anything else which is in or on the vertical mixer; and a discharge conveyor assembly secured to said chassis assembly, said discharge conveyor assembly providing a conveyed pathway extending between an outlet opening of the mixing tub member and a forage material discharge location, said discharge conveyor assembly including a stationary conveyor assembly and a movable conveyor assembly, said stationary conveyor assembly extending from a location at said outlet opening of the mixing tub member and to an end location, and said movable conveyor assembly extending from said end location of the stationary conveyor assembly to a free end thereof, said free end being adjustable between a top position generally above said end location of the stationary conveyor assembly and a bottom position which is below said end location of the stationary conveyor assembly.

26. The vertical mixer in accordance with claim 25, wherein said discharge conveyor assembly includes endless conveyor belting with an outside working surface having a raised pattern of a plurality of generally crescent-shaped members.

27. The vertical mixer in accordance with claim 25, wherein said endless belting is constructed of a material selected from the group consisting of rubber, synthetic rubber, and polymeric materials having a coefficient of friction on the order of or greater than synthetic rubber.

28. A vertical mixer for forage materials, the vertical mixer having a unibody construction and comprising:

a mixing tub assembly having a wide-mouthed access opening for receiving forage material within the mixing tub assembly;

a generally vertical mixing auger assembly rotatably mounted within said mixing tub assembly;

a chassis assembly which supports said mixing tub assembly;

a weighing mechanism which is in operative weight-receiving engagement with said chassis assembly and which measures the weight of the entire vertical mixer including said mixing tub assembly, said mixing auger assembly, and said chassis assembly, together with any forage material and anything else which is in or on the vertical mixer; and a discharge conveyor assembly having a conveyed pathway and being mounted onto the vertical mixer and a comb assembly having a plurality of generally downwardly depending tines spaced above said discharge conveyor assembly.

29. The vertical mixer in accordance with claim 28, wherein said comb assembly includes a support bar positioned transversely with respect to the flow path of the discharge conveyor assembly, said support bar having said plurality of tines secured thereto.

30. The vertical mixer in accordance with claim 28, further including a biasing member for permitting movement of said tines in a direction generally coinciding with the conveyed pathway of the discharge conveyor assembly when a preselected force is exceeded.

31. The vertical mixer in accordance with claim 28, wherein at least some of said tines have magnetic properties.

32. A transportable vertical mixer for forage materials, the vertical mixer having a unibody construction and comprising:

a mixing tub assembly having a wide-mouthed access opening for receiving forage material within the mixing tub assembly;

a generally vertical mixing auger assembly rotatably mounted within said mixing tub assembly;

a chassis assembly which supports said mixing tub assembly and to which said mixing tub assembly is secured, said chassis assembly having a plurality of wheels rotatably mounted therefrom by virtue of which the vertical mixer is transportable from one location to another;

an axle securely mounted to said chassis assembly to which is secured at least one weigh bar assembly to which at least one of said plurality of wheels is mounted for rotation; and said at least one weigh bar assembly is a component of a weighing mechanism, and said weighing mechanism measures the weight of the entire vertical mixer including said mixing tub assembly, said mixing auger assembly, and said chassis assembly, together with any forage material and anything else which is in or on the vertical mixer.

33. The vertical mixer in accordance with claim 32, wherein said at least one weigh bar assembly includes a spindle mounted within said axle, said spindle including a slot to facilitate deflection of the at least one weigh bar assembly when mounted within the axle.

34. The vertical mixer in accordance with claim 32, further including a load cell positioned at a hitch end of the chassis assembly.

35. The vertical mixer in accordance with claim 32, wherein said at least one weigh bar assembly is located within the axle and is secured therein in a removable manner, the at least one weigh bar assembly and wheel being removable for shipping.

36. A transportable vertical mixer for forage materials, the vertical mixer having a unibody construction and comprising:

a generally frusto-conical mixing tub assembly having a mixing tub member with a wide-mouthed access opening for receiving forage material within the mixing tub assembly;

a generally vertical mixing auger assembly rotatably mounted within said mixing tub assembly;

a chassis assembly which supports said mixing tub assembly and to which said mixing tub member is secured, said chassis assembly having a plurality of wheels rotatably mounted therefrom by virtue of which the vertical mixer is transportable from one location to another;

a weighing mechanism connected to said chassis assembly, said weighing mechanism measures the weight of the entire vertical mixer including said mixing tub assembly, said mixing auger assembly, and said chassis assembly, together with any forage material and anything else which is in or on the vertical mixer; and said mixing auger assembly includes a rotatable auger assembly rotatably secured to vertical tubing securely fixed to the bottom of the mixing tub assembly, and only thereto, said rotatable auger assembly being in driven relationship with a gear assembly which is in driven relationship with a source of rotational power.

37. The vertical mixer in accordance with claim 36, wherein the mixing auger assembly further includes a hold down assembly securing a rotatable drive tube to said gear assembly and to said rotatable auger assembly.

* * * * *

UNITED STATES PATENT AND TRADEMARK OFFICE
CERTIFICATE OF CORRECTION

PATENT NO. : 5,429,436
DATED : July 4, 1995
INVENTOR(S) : Thomas E. Stone

It is certified that error appears in the above-indentified patent and that said Letters Patent is hereby corrected as shown below:

On the cover page, under "Attorney, Agent, or Firm", replace
    "Fritzgibbon" with --FitzGibbon--.
In the Abstract of the Disclosure, line 4, delete the hyphen after
    "secured".
Col. 2, line 50, "Seeding" should read --feeding--.
Col. 3, line 5, insert --a-- after "is".
Col. 9, line 17, insert --of-- after "opening".
Col. 10, line 12, delete the hyphen after "securely".

Signed and Sealed this

Sixth Day of August, 1996

*Attest:*

BRUCE LEHMAN

*Attesting Officer*     *Commissioner of Patents and Trademarks*